United States Patent Office 3,794,643
Patented Feb. 26, 1974

3,794,643
QUINAZOLINEDIONE DERIVATIVES
Takahiro Yabuuchi, Takarazuka, and Hajime Fujimura, Akira Nakagawa, and Ryuichi Kimura, Kyoto, Japan, assignors to Hisamitsu Pharmaceutical Co., Inc., Tosu, Saga Prefecture, Japan
No Drawing. Filed Apr. 20, 1971, Ser. No. 135,693
Int. Cl. C07d 51/48
U.S. Cl. 260—260                    8 Claims

ABSTRACT OF THE DISCLOSURE

The present invention relates to novel quinazolinedione derivatives possessing excellent anti-inflammatory action and analgesic action, and process for the production thereof by reacting the compounds having the following general formula,

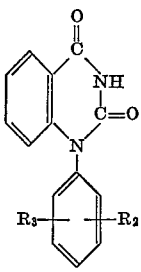

(wherein $R_2$ and/or $R_3$ represent hydrogen atom, $CF_3$, one or more of halogen atoms selected from the group consisting of Cl, Br and F, methyl-, methoxy- or ethoxy-radical), with the general formula, $R_1X$ or $R_2SO_4$ (wherein $R_1$ represents alkyl radical, substituted alkyl radical or acyl radical, X represents halogen atom, and R represents lower alkyl radical).

---

The present invention relates to novel quinazolinedione derivatives and process for the production of same, and, more particularly, to quinazolinedione derivatives and process for the production thereof expressed in the following general formula:

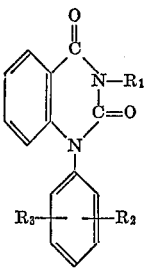

wherein $R_1$ represents alkyl radical, substituted alkyl radical or acyl radical; $R_2$ and/or $R_3$ represent hydrogen atom, $CF_3$, one or more of halogen atoms selected from the group consisting of Cl, Br and F, methyl-, methoxy- or ethoxy-radical.

Conventionally, aminopyrine, mefenamic acid, flufenamic acid and others were known as an anti-inflammatory and an analgesic, however, they possessed such a disadvantage to cause gastroenteric trouble. We have found that these novel quinazolinedione derivatives have excellent anti-inflammatory action and analgesic action, as described later, without causing gastroenteric trouble.

Thus, one of the objects of the present invention is to provide the process for producing such novel quinazoline-excellent anti-inflammatory action and analgesic action.

Further, another object of the present invention is to provide the process for producing such novel quinaboline-dione derivatives in high yield and advantageously.

According to the present invention, the aforesaid quinazolinedione derivatives are produced by reacting the compounds having the following general formula:

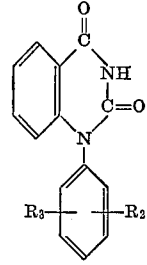

(wherein $R_2$ and/or $R_3$ have the same meaning as mentioned above) with the general formula, $R_1X$ or $R_2SO_4$ (wherein $R_1$ represents the same substances as mentioned above), R represents lower alkyl radical, and X represents halogen atom). Consequently, the reaction of the present invention can be understood as being alkylation.

The abovementioned compounds used as starting reaction materials in the present invention can be obtained in good yield by reacting N-phenylanthranilic acid or N-substituted phenylanthranilic acid with urea.

The quinazolinedione derivatives used as the aforesaid starting reaction materials include 1-phenyl-2,4-(1H,3H)-quinazolinedione or 1-substituted phenyl-2,4-(1H,3H)-quinazolinedione, for example, 1-(3'-triuuoromethylphenyl-2,4(1H,3H)-quinazolinedione,
1-(3'-chlorophenyl)-2,4(1H,3H)-quinazolinedione,
1-(2',3'-dichlorophenyl)-2,4(1H,3H)-quinazolinedione,
1-(2'-chlorophenyl)-2,4(1H,3H)-quinazolinedione,
1-(4'-chlorophenyl)-2,4(1H,3H)-quinazolinedione,
1-(3',4'-dichlorophenyl)-2,4(1H,3H)-quinazolinedione,
1-(2',6'-dichlorophenyl)-2,4(1H,3H)-quinazolinedione,
1-(3'-fluorophenyl)-,4(1H,3H)-quinazolinedione,
1-(4'-fluorophenyl)-2,4(1H,3H)-quinazolinedione,
1-(3'-bromophenyl)-2,4(1H,3H)-quinazolinedione,
1-(2',3'-dimethylphenyl)-2,4(1H,3H)-quinazolinedione,
1-(3'-methoxyphenyl)-2,4(1H,3H)-quinazolinedione,
1-(4'-ethoxyphenyl)-2,4(1H,3H)-quinazolinedione and
1-(3'-methylphenyl)-2,4(1H,3H)-quinazolinedione.

One group of compounds used as alkylating agent of the abovementioned starting reaction materials in the present invention is expressed by the general formula $R_1X$, wherein $R_1$ can either be saturated or unsaturated alkyl or alkyl radical substituted by aryl-, halogen- hydroxy-, amino-, alkoxy-, alkylthio-, phenoxy-, acyloxy-, acyl-, carbamoyloxy- or carbamoylalkoxy-radical, and said compounds include, for example, ethyl iodide, n-butyl bromide, iso-amyl iodide, benzylbromide, 1-bromo-2-chloroethane, diethylaminoethylchloride, ethylenebromohydrine, chloromethylethylether, 2-bromoethylacetate, 1-chloro-2-(N,N-dimethylcarbamoyloxy)-ethane, p-chlorobenzoylchloride, acetyl chloride benzoylchloride, propionyl chloride, 2-bromoethylacetate, dimethylaminopropylchloride, 2-bromoethylethylether and 2-bromoethylbenzoate. Further, the other group of compounds used as alkylating agent same as above is expressed by the general formula $R_2SO_4$, wherein R can be lower alkyl radical such as methyl- or ethyl- radical, for example, dimethyl sulfate being most typical.

The reaction in the present invention is preferred to be performed in the presence of metallic compounds such as sodium alcoholate, sodium amide and sodium hydride, organic base such as pyridine and trimethylamine or inorganic base such as alkali hydroxide and alkali carbonate.

Further, since the reaction of the present invention is usually made in the organic solvent such as acetone, dimethylformamide and others, it is carried out at a wide range of temperature. Consequently, the reaction temperature is not critical but can be either normal, warm or cool.

The compounds obtainable according to the present invention show significant anti-inflammatory action and analgesic action as is apparent from the experimental examples as set forth below.

EXAMPLES

Tests have been performed on acute toxicity, anti-inflammatory effect and analgesic effect of the invented compounds.

Testing method of acute toxicity

Tragacanth emulsion was given by intraperitoneally to healthy DD mice of 15 to 20 g., and $LD_{50}$ and its 95% confidence limits were calculated by Litchfield-Wilcoxon method from the lethal number after 72 hours.

Testing method of anti-inflammatory effect

The drugs subjected to this test were given intragastrically to healthy female Wistar rats of 100 to 140 g., the inflammatory substance, carrageenin (1%, 0.1 ml.), was injected subcutaneously into the soles of the rats' hind legs after 60 minutes, and the inhibition rates (percent) against edema were measured by comparing the edema consequently arose to the tested rats with the controls to which the drugs were not given. The amount of drugs given was 200 mg./kg. and the mean inhibition rates were shown of 4 to 5 rats in a group.

In performing the above test, not only the compounds obtained by the present invention were employed, but the conventionally known compounds such as mefenamic acid and flufenamic acid were also subjected to the same test. The comparisons between the former and the latter were shown in the following table.

TEST EXAMPLES OF THE COMPOUNDS OBTAINED BY THE PRESENT INVENTION

| Compounds | Acute toxicity $LD_{50}$, mg./kg. i.p., 95% C.L. | Anti-inflammatory effect, Inhibition Rate against Edema induced by carrageenin |
|---|---|---|
| 1-(3'-trifluoromethylphenyl)-3-methyl-2,4(1H,3H)-quinazolinedione. | 360 (340-381) | +++ |
| 1-(3'-trifluoromethylphenyl)-3-ethyl-2,4(1H,3H)-quinazolinedione. | 373 (341-408) | ++++ |
| 1-(3'-trifluoromethyl)-3-(2''-chloroethyl)-2,4(1H,3H)-quinazolinedione. | >800 | +++ |
| 1-(3'-trifluoromethylphenyl)-3-(2''-diethylaminoethyl)-2,4(1H,3H)-quinazolinedione hydrochloride. | 158 (137-182) | ++++ |
| 1-(3'-trifluoromethylphenyl)-3-(2''-hydroxyethyl)-2,4 (1H,3H)-quinazolinedione. | 253 (220-291) | ++++ |
| 1-(3'-trifluoromethylphenyl)-3-(2''-acetoxyethyl)-2,4 (1H,3H)-quinazolinedione. | 460 (430-492) | ++++ |
| 1-(3'-trifluoromethylphenyl)-3-(2''-acetoxyethyl)-2,4(1H,3H)-quinazolinedione. | >400 | +++ |
| 1-(3'-chlorophenyl)-3-ethyl-2,4(1H,3H)-quinazolinedione. | >800 | ++++ |
| 1-(3'-chlorophenyl)-3-(2''-hydroxyethyl)-2,4(1H,3H)-quinazolinedione. | >400 | ++++ |
| 1-(3'-fluorophenyl)-3-ethyl-2,4 (1H,3H)-quinazolinedione. | >400 | ++++ |
| Comparison: | | |
| Mefenamic acid | 420 (395-458) | +++ |
| Flufenamic acid | 200 (180-222) | +++ |

In the above table +++ shows that the mean inhibition rate is 30–39%, and ++++ shows that said rate is more than 40%.

Testing method of analgesic effect

Morphinized Haffner method: The test was performed by employing healthy male DD mice of 15–17 g., a single group consisted of 10 mice, with regard to inhibition of withdrawal against simultaneously pressing at the root of the tail using in combination with the threshold dose (2.5 mg./kg. s.c.) of morphine hydrochloride. The test drugs had been given intragastrically 30 minutes before morphine was given, and $ED_{50}$ and 95% confidence limits were calculated by Litchfield-Wilcoxon method from its result.

Acetic acid stretching method: This test was performed by employing healthy male DD mice of 15–17 g., a single group consisted of 6 to 8 mice, with regard to inhibition of stretching (or squirm) symptoms by intraperitoneal injection 0.1 ml./10 g. of 0.6% acetic acid. The test drugs had been given intragastrically 30 minutes before acetic acid was given, and $ED_{50}$ and 95% confidence limits were calculated by Litchfield-Wilcoxon method from its result.

In performing the above test, not only the compounds obtained by the present invention were employed, but the conventionally known compounds such as mefenamic acid, flufenamic acid and aminopyrine were also subjected to the same test. The comparison between the former and the latter is shown in the following table.

TEST EXAMPLES OF THE COMPOUNDS OBTAINED BY THE PRESENT INVENTION

| | Testing method | |
|---|---|---|
| Compounds | Acetic acid stretching method $ED_{50}$=mg./kg., p.o. | Morphinized Haffner method $ED_{50}$=mg./kg. (C.L. 95%) |
| 1-(3'-trifluoromethylphenyl)-3-ethyl-2,4(1H,3H)-quinazolinedione. | 100→33% peak | 148(135-163). |
| 1-(3'-trifluoromethylphenyl)-3-(2''-hydroxyethyl)-2,4 (1H,3H)-quinazolinedione. | 35(28-43) | 38(26-54). |
| 1-(3'-trifluoromethylphenyl)-3-(2''-ethoxyethyl)-2,4(1H,3H) quinazolinedione. | 200→60% peak | 100→60% peak. |
| 1-(3''-trifluoromethylphenyl)-3-(2'-acetoxyethyl)-2,4(1H,3H)-quinazolinedione. | 94(70-126) | 124(114-135). |
| 1-(3'-chlorophenyl)-3-ethyl-2,4(1H,3H)-quinazolinedione. | 177(140-223) | 100→60% peak. |
| 1-(3'-chlorophenyl)-3-(2''-hydroxyethyl)-2,4(1H,3H)-quinazolinedione. | 56(44-72) | 75→55% peak. |
| 1-(3'-chlorophenyl)-3-(2''-ethoxyethyl)-2,4(1H,3H)-quinazolinedione. | 82(50-134) | 130→50% peak. |
| 1-(3'-chlorophenyl)-3-(2''-acetoxyethyl)-2,4(1H, 3H)-quinazolinedione. | 65(45-94) | 75→60% peak. |
| Comparison: | | |
| Aminopyrine | 93(60-143) | 65(45-94). |
| Mefenamic acid | 134(100-180) | 140(114-172). |
| Flufenamic acid | 170(121-238) | 200→35% peak. |

The examples of the present invention are shown below which should be considered to be the ones for illustrating the present invention concretely, and not for limiting the scope of the present invention.

Examples of quinazolinedione derivatives produced according to the present invention

| | Product | | | |
|---|---|---|---|---|
| I*—R X | Molecular formula | M.P. or B.P. (°C.) | Recrystal solvent | Appearance |
| Br-CH$_2$—CH$_2$—CH$_3$ | C$_{18}$H$_{15}$F$_3$N$_2$O$_2$ | M.P. 153 | Methanol | Colorless prisms. |
| Br-CH(CH$_3$)(CH$_3$) | C$_{18}$H$_{15}$F$_3$N$_2$O$_2$ | M.P. 131-3 | do | Do. |
| Br-CH$_2$-CH(CH$_3$)(CH$_3$) | C$_{19}$H$_{17}$F$_3$N$_2$O$_2$ | M.P., 111-3 | do | Do. |

TABLE—Continued

| I*—R X | Product Molecular formula | M.P. or B.P. (°C.) | Recrystal solvent | Appearance |
|---|---|---|---|---|
| Br—CH₂—CH₂—CH₂—CH₂—CH₃ | C₂₀H₁₉F₃N₂O₂ | M.P., 102-3 | do | Do. |
| Br—CH₂—CH₂—CH₂—CH₂—CH₂—CH₃ | C₂₁H₂₁F₃N₂O₂ | M.P., 77-8 | do | Do. |
| Br—CH₂—CH=CH₂ | C₁₈H₁₃F₃N₂O₂ | M.P., 123-4 | do | Do. |
| Cl—CH₂—C₆H₄—Cl | C₂₂H₁₄ClF₃N₂O₂ | M.P., 196-7 | Ethanol | Do. |
| Cl—CH₂—C₆H₄—OCH₃ | C₂₃H₁₇F₃N₂O₃ | M.P., 203-4 | do | Do. |
| Br—CH₂—CH₂—CH₂—Cl | C₁₈H₁₄ClF₃N₂O₂ | M.P., 134-5 | Methanol | Do. |
| Cl—CH₂—CH₂—N(CH₃)₂ | C₁₉H₁₉ClF₃N₃O₂ | M.P., 137-8 (hydrochloride) | Ethanol plus n-hexane | Do. |
| Cl—CH₂—CH₂—CH₂—N(CH₃)₂ | C₂₀H₂₁ClF₃N₃O₂ | M.P., 245 (hydrochloride) | Ethyl-acetate | Do. |
| Cl—CH₂—CH₂—CH₂—N(C₂H₅)₂ | C₂₂H₂₅ClF₃N₃O₂ | M.P., 225-6 (hydrochloride) | do | Do. |
| Cl—CH₂—CH₂—CH₂—N(morpholine) | C₂₂H₂₃ClF₃N₃O₃ | M.P., 180-1 (hydrochloride) | do | Do. |
| Cl—CH₂—CH₂—CH₂—N(N-methylpiperazine) | C₂₃H₂₇Cl₂F₃N₄O₂ | M.P., 272-3 (dihydrochloride) | Ethanol | Colorless prisms. |
| Cl—CH₂—CH₂—CH₂—N(piperidine) | C₂₃H₂₅ClF₃N₃O₂ | M.P., 252-3 (hydrochloride) | Chloroform plus n-hexane | Pale yellow prisms |
| Cl—CH₂—CH₂—CH₂—OH | C₁₈H₁₅F₃N₂O₃ | M.P., 106-7 | Methanol | Colorless prisms. |
| Cl—CH₂—CH(OH)—CH₂—OH | C₁₈H₁₅F₃N₂O₄ | M.P., 154-5.5 | Ethanol | Do. |
| Cl—CH₂—CH₂—O—CH₂—CH₃ | C₁₉H₁₇F₃N₂O₃ | 117-8 | Methanol | Do. |
| Cl—CH₂—CH₂—O—CH₃ | C₁₈H₁₅F₃N₂O₃ | B.P., 205 | | Pale yellow oil. |
| Cl—CH₂—CH₂—O—C₆H₅ | C₂₃H₁₇F₃N₂O₃ | M.P., 155-6 | Methanol | Colorless prisms. |
| Cl—CH₂—CH₂—O—CH₂—C₆H₅ | C₂₄H₁₉F₃N₂O₃ | B.P., 235 | | Pale yellow oil. |
| Cl—CH₂—CH₂—O—CH=CH₂ | C₁₉H₁₅F₃N₂O₃ | M.P., 127.5-8.5 | Methanol | Colorless prisms. |
| Cl—CH₂—CH₂—O—COC₂H₅ | C₂₀H₁₇F₃N₂O₄ | M.P., 104-5 | do | Do. |
| Cl—CH₂—CH₂—O—CO—C₆H₅ | C₂₄H₁₇F₃N₂O₄ | M.P., 150-1 | do | Do. |
| Cl—CH₂—COCH₃ | C₁₈H₁₃F₃N₂O₃ | M.P., 184-5 | do | Do. |
| Cl—CH₂—CH₂—N(1-(3'-trifluoromethylphenyl)quinazolinedione) | C₃₂H₂₀F₆N₄O₄ | M.P., 132-2.5 | Dimethylformamide plus water. | Do. |
| Cl—CH₂—O—CH₂—CH₂—CH₂—N(1-(3'-trifluoromethylphenyl)quinazolinedione) | C₃₂H₂₄F₆N₄O₅ | M.P., 222-3 | Methanol plus ethylacetate. | Colorless prisms. |
| Cl—CH₂—CH₂—S—CH₂—CH₃ | C₁₉H₁₇F₃N₂O₂S | M.P., 90-1 | Methanol | Do. |
| Cl—CH₂CH₂—O—CH₂—CONH₂ | C₁₉H₁₆F₃N₃O₄ | M.P., 153-4 | do | Do. |

NOTE.—The I* shown in the above table represents the general formula of the compounds to be reacted with the above-mentioned 1-(3'-trifluoromethylphenyl)-2,4(1H,3H)-quinazolinedione.

| II*—R X | Product | | | |
|---|---|---|---|---|
| | Molecular formula | M.P. or B.P. (°C.) | Recrystal solvent | Appearance |
| Cl—CO—CH$_2$—CH$_3$ | C$_{18}$H$_{13}$F$_3$N$_2$O$_3$ | M.P., 177.5-8.5 | Methanol | Colorless needles. |
| Br—CH$_2$—CH$_2$—Br | C$_{17}$H$_{12}$BrF$_3$N$_2$O$_2$ | M.P., 144.5-5.5 | do | Colorless prisms. |
| Cl—CH$_2$—CH$_2$—⟨phenyl⟩ | C$_{23}$H$_{17}$F$_3$N$_2$O$_2$ | M.P., 122.5-3.5 | do | Colorless needles. |
| ClCH(CH$_3$)—⟨phenyl⟩ | C$_{23}$H$_{17}$F$_3$N$_2$O$_2$ | M.P., 142.5-3.5 | do | Colorless prisms. |
| Br—CH$_2$—CH$_2$O—CON(CH$_3$)$_2$ | C$_{20}$H$_{18}$F$_3$N$_3$O$_4$ | M.P., 157-8 | do | Do. |

NOTE.—The II* shown in the above table represents the general formula of the compounds to be reacted with the above-mentioned 1-(3'-trifluoromethylphenyl)-2,4(1H,3H)-quinazolinedione.

| III*—R X | Product | | | |
|---|---|---|---|---|
| | Molecular formula | M.P. or B.P. (° C.) | Recrystal solvent | Appearance |
| BrCH$_2$CH$_2$OCOCH$_3$ | C$_{18}$H$_{15}$FN$_2$O$_4$ | M.P., 115.5-6.5 | Methanol | Colorless prisms. |
| ICH$_2$CH$_3$ | C$_{16}$H$_{13}$FN$_2$O$_2$ | M.P., 147.5-8.5 | do | Do. |
| BrCH$_2$CH$_2$OCH$_2$CH$_3$ | C$_{18}$H$_{17}$FN$_2$O$_3$ | M.P., 109-10 | do | Do. |
| BrCH$_2$CH$_2$Cl | C$_{16}$H$_{12}$ClFN$_2$O$_2$ | M.P., 185.5-6.5 | do | Do. |

NOTE.—III* shown in the above table represents the general formula of the compounds to be reacted with the above-mentioned 1-(3'-fluorophenyl)-2,4(1H,3H)-quinazolinedione.

| IV*—R X | Product | | | |
|---|---|---|---|---|
| | Molecular formula | M.P. or B.P. (° C.) | Recrystal solvent | Appearance |
| ICH$_2$CH$_3$ | C$_{16}$H$_{13}$BrN$_2$O$_2$ | M.P., 187.5-8.5 | Ethanol | Colorless prisms. |
| BrCH$_2$CH$_2$OCH$_2$CH$_3$ | C$_{18}$H$_{17}$BrN$_2$O$_3$ | M.P., 155-7 | Methanol | Do. |
| BrCH$_2$CH$_2$OH | C$_{16}$H$_{13}$BrN$_2$O$_3$ | M.P., 161.5-2 | Methanol plus water | Do. |
| BrCH$_2$CH$_2$Cl | C$_{16}$H$_{12}$ClBrN$_2$O$_2$ | M.P., 184-6 | Dimethyl-formamide | Pale yellow prisms. |

NOTE.—The IV* shown in the above table represents the general formula of the compounds to be reacted with the above-mentioned 1-(3'-bromophenyl)-(2,4(1H,3H) quinazolinedione.

| V*—R X | Product | | | |
|---|---|---|---|---|
| | Molecular formula | M.P. or B.P. (° C.) | Recrystal solvent | Appearance |
| BrCH$_2$CH$_2$OCOCH$_3$ | C$_{20}$H$_{20}$N$_2$O$_4$ | M.P., 181-3 | Methanol plus dimethylformamide. | Pale yellow prisms. |
| BrCH$_2$CH$_2$OCH$_2$CH$_3$ | C$_{20}$H$_{22}$N$_2$O$_3$ | M.P., 104-6 | Methanol | Colorless needles. |

NOTE.—The V* shown in the above table represents the general formula of the compounds to be reacted with the above-mentioned 1-(2',3'-dimethylphenyl)-2,4 (1H,3H)-quinazolinedione.

| VI*—R X | Product | | | |
|---|---|---|---|---|
| | Molecular formula | M.P. or B.P. (° C.) | Recrystal solvent | Appearance |
| ICH$_2$CH$_3$ | C$_{16}$H$_{13}$FN$_2$O$_2$ | M.P., 213-5 | Methanol plus dimethylformamide. | Colorless prisms. |
| BrCH$_2$CH$_2$OCOCH$_3$ | C$_{18}$H$_{15}$FN$_2$O$_4$ | M.P., 144-6 | Methanol | Do. |
| BrCH$_2$CH$_2$Cl | C$_{16}$H$_{12}$ClFN$_2$O$_2$ | M.P., 205-8 | Dimethylformamide | Do. |

NOTE.—The VI* shown in the above table represents the general formula of the compounds to be reacted with the above-mentioned 1-(4'-fluorophenyl)-2,4(1H, 3H) quinazolinedione.

| VII*—R X | Product | | | |
|---|---|---|---|---|
| | Molecular formula | M.P. or B.P. (° C.) | Recrystal solvent | Appearance |
| ICH$_2$CH$_3$ | C$_{17}$H$_{16}$N$_2$O$_2$ | M.P., 139.5-40.5 | Methanol | Colorless prisms. |
| BrCH$_2$CH$_2$OCOCH$_3$ | C$_{19}$H$_{18}$N$_2$O$_4$ | M.P., 150-1 | Methanol dimethylformamide | Do. |
| BrCH$_2$CH$_2$OCH$_2$CH$_3$ | C$_{19}$H$_{20}$N$_2$O$_3$ | M.P., 136-7 | Methanol | Do. |

NOTE.—The VII* shown in the above table represents the general formula of the compounds to be reacted with the above-mentioned 1-(3'-methylphenyl)-2,4(1H,3H) quinazolinedione.

| VIII*—R X | Product | | | |
|---|---|---|---|---|
| | Molecular formula | M.P. or B.P. (° C.) | Recrystal solvent | Appearance |
| ICH$_2$CH$_3$ | C$_{17}$H$_{16}$N$_2$O$_3$ | M.P., 164-5 | Methanol | Colorless prisms. |

NOTE.—The VIII* shown in the above table represents the general formula of the compounds to be reacted with the above-mentioned 1-(3'-methoxyphenyl)-2,4(1H,3H)-quinazolinedione.

| IX*—R X | Product | | | |
|---|---|---|---|---|
| | Molecular formula | M.P. or B.P. (° C.) | Recrystal solvent | Appearance |
| ICH$_2$CH$_3$ | C$_{17}$H$_{16}$N$_2$O$_3$ | M.P., 191-3 | Ethanol plus dimethylformamide. | Colorless prisms. |
| BrCH$_2$CH$_2$OCOCH$_3$ | C$_{19}$H$_{18}$N$_2$O$_5$ | M.P., 134.5-5.5 | Methanol | Do. |
| BrCH$_2$CH$_2$OCH$_2$CH$_3$ | C$_{19}$H$_{20}$N$_2$O$_4$ | M.P., 136-8 | do | Do. |
| BrCH$_2$CH$_2$OH | C$_{17}$H$_{16}$N$_2$O$_4$ | M.P., 166.5-8 | do | Do. |

NOTE.—The IL* shown in the above table represents the general formula of the compounds to be reacted with .the above-mentioned 1-(4'-ethoxyphenyl)-2,4(1H,3H)-quinazalinedione.

| X*—R X | Product | | | |
|---|---|---|---|---|
| | Molecular formula | M.P. or B.P. (° C.) | Recrystal solvent | Appearance |
| ICH$_2$CH$_3$ | C$_{16}$H$_{13}$ClN$_2$O$_2$ | M.P., 160-3 | Methanol | Colorless prisms. |
| ICH$_2$CH$_2$CH$_2$CH$_3$ | C$_{18}$H$_{17}$ClN$_2$O$_2$ | M.P., 144-5 | ___do___ | Colorless needles. |
| BrCH$_2$CH$_2$OCOCH$_3$ | C$_{18}$H$_{15}$ClN$_2$O$_4$ | M.P., 145-7 | Ethanol | Pale yellow prisms. |
| BrCH$_2$CH$_2$Cl | C$_{16}$H$_{12}$ClN$_2$O$_2$ | M.P., 169-70 | ___do___ | Colorless prisms. |
| BrCH$_2$CH$_2$OCH$_2$CH$_3$ | C$_{18}$H$_{17}$ClN$_2$O$_3$ | M.P., 134-6 | Methanol | Do. |
| ClCH$_2$COOCH$_2$CH$_3$ | C$_{19}$H$_{15}$ClN$_2$O$_4$ | M.P., 181-3 | Ethanol | Colorless needles. |
| BrCH$_2$CH$_2$OH | C$_{16}$H$_{13}$ClN$_2$O$_2$ | M.P., 145-6 | Methanol | Do. |

NOTE.—The X* shown in the above table represents the general formula of the compounds to be repeated with the above-mentioned 1-(4'-chlorophenyl)-2,4(1H,3H)-quinazolinedione.

| XI*—R X | Product | | | |
|---|---|---|---|---|
| | Molecular formula | M.P. or B.P. (° C.) | Recrystal solvent | Appearance |
| BrCH$_2$CH$_2$OCOCH$_3$ | C$_{18}$H$_{15}$ClN$_2$O$_4$ | M.P., 144-5 | Methanol | Colorless prisms. |
| BrCH$_2$CH$_2$OCH$_2$CH$_3$ | C$_{18}$H$_{17}$ClN$_2$O$_3$ | M.P., 129-30 | ___do___ | Colorless needles. |
| BrCH$_2$CH$_2$OH | C$_{16}$H$_{13}$ClN$_2$O$_3$ | M.P., 149-52 | ___do___ | Colorless prisms. |

NOTE.—The XI* shown in the above table represents the general formula of the compounds to be reacted with the above-mentioned 1-(2'-chlorophenyl)-2,4(1H,3H)-quinazolinedione.

| XII*—R X | Product | | | |
|---|---|---|---|---|
| | Molecular formula | M.P. or B.P. (° C.) | Recrystal solvent | Appearance |
| ICH$_2$CH$_3$ | C$_{16}$H$_{13}$ClN$_2$O$_2$ | M.P., 179-80 | Ethanol | Colorless prisms. |
| BrCH$_2$CH$_2$OCH$_2$CH$_3$ | C$_{18}$H$_{17}$ClN$_2$O$_3$ | M.P., 115-6 | ___do___ | Do. |
| BrCH$_2$CH$_2$OCOCH$_3$ | C$_{18}$H$_{15}$ClN$_2$O$_4$ | M.P., 136-7 | Methanol | Do. |
| BrCH$_2$CH$_2$OH | C$_{16}$H$_{13}$ClN$_2$O$_3$ | M.P., 149-50.5 | ___do___ | Do. |
| BrCH$_2$CH$_2$CH$_2$OH | C$_{17}$H$_{15}$ClN$_2$O$_3$ | M.P., 136.5-9.5 | ___do___ | Do. |
| ClCH$_2$COOCH$_2$CH$_3$ | C$_{18}$H$_{15}$ClN$_2$O$_4$ | M.P., 127-9 | ___do___ | Do. |
| BrCH$_2$CH$_2$Cl | C$_{16}$H$_{12}$Cl$_2$N$_2$O$_2$ | M.P., 170-1 | ___do___ | Do. |
| ICH$_2$CH$_2$CH$_2$CH$_3$ | C$_{18}$H$_{17}$ClN$_2$O$_2$ | M.P., 141-6 | ___do___ | Do. |
| BrCH$_2$CH(CH$_3$)$_2$ | C$_{18}$H$_{17}$ClN$_2$O$_2$ | M.P., 121-3 | ___do___ | Do. |
| ClCH$_2$CH$_2$CH$_3$ | C$_{17}$H$_{15}$ClN$_2$O$_2$ | M.P., 132-4 | ___do___ | Do. |
| ICH(CH$_3$)$_2$ | C$_{17}$H$_{15}$ClN$_2$O$_2$ | M.P., 140-1.5 | ___do___ | Colorless needles. |

NOTE.—The XII* shown in the above table represents the general formula of the compounds to be reacted with the above-mentioned 1-(3'-chlorophenyl)-2,4(1H,3H)-quinazolinedione.

| XIII*—R X | Product | | | |
|---|---|---|---|---|
| | Molecular formula | M.P. or B.P. (° C.) | Recrystal solvent | Appearance |
| ICH$_2$CH$_3$ | C$_{16}$H$_{12}$Cl$_2$N$_2$O$_2$ | M.P., 166-7.5 | Methanol | Colorless prisms. |
| BrCH$_2$CH$_2$OCH$_2$CH$_3$ | C$_{18}$H$_{16}$Cl$_2$N$_2$O$_3$ | M.P., 102.5-4 | ___do___ | Do. |
| BrCH$_2$CH$_2$OH | C$_{16}$H$_{12}$Cl$_2$N$_2$O$_3$ | M.P., 144.5-6 | Methanol plus water | Colorless needles. |

NOTE.—The XIII* shown in the above table represents the general formula of the compounds to be reacted with the above-mentioned 1-(2',3'-dichlorophenyl)-2,4(1H,3H)-quinazolinediane.

| XIV*—R X | Product | | | |
|---|---|---|---|---|
| | Molecular formula | M.P. or B.P. (° C.) | Recrystal solvent | Appearance |
| ICH$_2$CH$_3$ | C$_{16}$H$_{12}$Cl$_2$N$_2$O$_2$ | M.P., 139-41 | Methanol | Colorless prisms. |
| BrCH$_2$CH$_2$OCOCH$_3$ | C$_{18}$H$_{14}$Cl$_2$N$_2$O$_4$ | M.P., 120-1 | ___do___ | Colorless needles. |
| BrCH$_2$CH$_2$OCH$_2$CH$_3$ | C$_{18}$H$_{16}$Cl$_2$N$_2$O$_3$ | M.P., 114-5.5 | ___do___ | Do. |
| BrCH$_2$CH$_2$OH | C$_{16}$H$_{12}$Cl$_2$N$_2$O$_3$ | M.P., 145-7 | ___do___ | Pale yellow prisms. |
| BrCH$_2$CH$_2$Cl | C$_{16}$H$_{11}$Cl$_3$N$_2$O$_2$ | M.P., 155-6 | Ethanol plus dimethylformamide. | Colorless prisms. |

NOTE.—The XIV* shown in the above table represents the general formula of the compounds to be reacted with the above-mentioned 1-(3',4'-dichlorophenyl)-2,4(1H,3H)-quinazolinedione.

| XV*—R X | Product | | | |
|---|---|---|---|---|
| | Molecular formula | M.P. or B.P. (° C.) | Recrystal solvent | Appearance |
| ICH$_2$CH$_3$ | C$_{16}$H$_{14}$N$_2$O$_2$ | M.P., 196.5-7.5 | Ethanol | Colorless prisms. |
| ICH$_2$CH$_2$CH$_2$CH$_3$ | C$_{18}$H$_{18}$N$_2$O$_2$ | M.P., 106-7 | Methanol plus water | Do. |
| ClCH$_2$COOCH$_2$CH$_3$ | C$_{18}$H$_{16}$N$_2$O$_4$ | M.P., 164-5 | Methanol | Do. |
| BrCH$_2$CH$_2$OH | C$_{16}$H$_{14}$N$_2$O$_3$ | M.P., 205.5-8 | ___do___ | Do. |
| BrCH$_2$CH$_2$OCH$_2$CH$_3$ | C$_{18}$H$_{18}$N$_2$O$_3$ | M.P., 93-5 | ___do___ | Do. |
| BrCH$_2$CH$_2$OCOCH$_3$ | C$_{18}$H$_{16}$N$_2$O$_4$ | M.P., 159-60.5 | ___do___ | Do. |
| BrCH$_2$CH$_2$Cl | C$_{16}$H$_{13}$ClN$_2$O$_2$ | M.P., 214-6.5 | Dimethylformamide | Do. |
| BrCH$_2$CH$_2$CH$_2$Cl | C$_{17}$H$_{15}$ClN$_2$O$_2$ | M.P., 153-4 | Methanol | Pale yellow prisms. |
| ClCH(CH$_3$)COOCH$_2$CH$_3$ | C$_{19}$H$_{18}$N$_2$O$_4$ | M.P., 129-30 | ___do___ | Do. |
| BrCH$_2$OCH$_2$CONH$_2$ | C$_{17}$H$_{15}$N$_3$O$_4$ | M.P., 159.5-60.5 | ___do___ | Yellow needles. |
| ClCH$_2$CH$_2$O—C$_6$H$_5$ | C$_{22}$H$_{18}$N$_2$O$_3$ | M.P., 188-9 | Dimethylformamide | Colorless needles. |
| ClCH$_2$—C$_6$H$_4$—Cl | C$_{21}$H$_{15}$ClN$_2$O$_2$ | M.P., 179-80 | Methanol | Colorless needles. |
| ClCH$_2$—C$_6$H$_4$—OCH$_3$ | C$_{22}$H$_{18}$N$_2$O$_3$ | M.P., 178-9 | Methanol plus dimethylformamide. | Colorless prisms. |

NOTE.—The XV* shown in the above table represents the general formula of the compounds to be reacted with the above-mentioned 1-phenyl-2,4-(1H,3H)-quinazolinedione.

Examples of process for the production of quinazolinedione derivatives according to the present invention Example 1: The mixture of 5.4 g. 1-(3'-trifluoromethylphenyl)-2,4(1H,3H)-quinazolinedione, 1.3 g. dimethylsulfate, and 30 cc. acetone was heated for 2 hours at 50–70° C. on a water bath, then the solvent was distilled. The residue was then poured into 20% sodium hydroxide solution under cooling for neutralization, the crystals produced were filtered, washed with water and dried, and, upon recrystallization from ethanol, 4.1 g. of colorless prisms of 1-(3'-trifluoromethylphenyl)-3-methyl-2,4(1H,3H)-quinazolinedione were obtained.

Melting point and ultimate analysis value of this substance were as follows:

Melting point: 189–189.5° C.
Ultimate analysis value: $C_{16}H_{11}F_3N_2O_2$.
Theoretical values: C, 60.00; H, 3.46; N, 8.75.
Found values: C, 60.01; H, 3.66; N, 8.46.

Example 2: 5.4 g. 1-(3'-trifluoromethylphenyl-2,4(1H,3H)-quinazolinedione, and 40 cc. dried dimethylformamide were added with 1 g. of 50% sodium hydride and stirred for 7 hours. Then, 3.69 of ethyliodide were further added and reacted for 3 hours at room temperature. The solvent was then distilled under reduced pressure, the residue was added with water, the crystals produced were filtered, and, upon recrystallization from ethanol, 5 g. of colorless prisms of 1-(3'-trifluoromethylphenyl)-3-ethyl-2,4(1H,3H)-quinazolinedione were obtained.

Melting point and ultimate analysis value of this substance were as follows:

Melting point: 156–157° C.
Ultimate analysis value: $C_{17}H_{13}F_3N_2O_2$
Theoretical values: C, 61.07; H, 3.92; N, 8.38.
Found values: C, 61.07; H, 3.98; N, 8.32.

Example 3: 0.6 g. metallic sodium was added to 10 cc. n-butylalcohol and n-butyl alcoholate was formed. To this was added the solution obtained by dissolving 6.5 g. 1-(3' - trifluoromethylphenyl)-2,4(1H,3H)-quinazolinedione in 20 cc. dried dimethylformamide, said solution mixture was stirred for 1 hour, then 10.5 g. of n-butylbromide were added and stirred for 3 hours at room temperature. Water was further added, the crystals produced were filtered and dried, and, upon recrystallization from methyl alcohol, 6.1 g. of colorless prisms of 1-(3'-trifluoromethylphenyl)-3-(n-butyl)-2,4(1H,3H)-quinazolinedione were obtained.

Melting point and ultimate analysis value of this substance were as follows:

Melting point: 126–127° C.
Ultimate analysis value: $C_{19}H_{17}F_3N_2O_2$.
Theoretical values: C, 62.98; H, 4.73; N, 7.73.
Found values: C, 63.39; H, 5.04; N, 7.95.

Example 4: 0.5 g. sodium amide was added to the mixture of 3.6 g. 1-(3'-trifluoromethylphenyl)-2,4(1H,3H)-quinazolinedione and 30 cc. dried dimethylformamide, and the mixture was stirred for one hour. Then, 5.9 g. of iso-amyliodide were added and reacted for 3 hours at room temperature. The solvent was then distilled under reduced pressure, the residue was added with water, the crystals produced were filtered and dried, and, upon recrystallization from methyl alcohol, 3.9 g. of colorless prisms of 1-(3'-trifluoromethylphenyl)-3-(iso-amyl)-2,4-(1H,3H)-quinazolinedione were obtained.

Melting point and ultimate analysis value of this substance were as follows:

Melting point: 115–115.5° C.
Ultimate analysis value: $C_{20}H_{19}F_3N_2O_2$
Theoretical values: C, 63.82; H, 5.09; N, 7.44.
Found values: C, 63.95; H, 5.18; N, 7.38.

Example 5: 1 g. of 50% sodium hydroxide was added to the mixture of 5.4 g. 1-(3'-trifluoromethylphenyl)-2,4-(1H,3H)-quinazolinedione and 40 cc. dried dimethylformamide, and the mixture was stirred for one hour. Then, 4 g. of benzylbromide were added and reacted for 3 hours at room temperature. The solvent was then distilled under reduced pressure, the residue was added with water, the crystals produced were filtered and dried, and, upon recrystallization from methyl alcohol, 6 g. of colorless prisms of 1-(3'-trifluoromethylphenyl)-3-benzyl-2,4(1H,3H)-quinazolinedione were obtained.

Melting point and ultimate analysis value of this substance were as follows:

Melting point: 183–184° C.
Ultimate analysis value: $C_{22}H_{15}F_3N_2O_2$
Theoretical values: C, 66.66; H, 3.81; N, 7.07.
Found values: C, 66.67; H, 3.90; N, 6.79.

Example 6: 1.3 g. of 50% sodium hydride was added to the mixture of 7 g. 1-(3'-trifluoromethylphenyl)-2,4-(1H,3H)-quinazolinedione and 40 cc. dried dimethylformamide, and the mixture was stirred for one hour. Then 4.3 g. 1-bromo-2-chloroethane were added and reacted for 3 hours at room temperature. The solvent was then distilled under reduced pressure, the residue was added with water, the crystals produced were filtered and dried, and, upon recrystallization from methyl alcohol, 6.3 g. of colorless prisms of 1-(3'-trifluoromethylphenyl)-3-(2'' - chloroethyl)-2,4(1H,3H) - quinazolinedione were obtained.

Melting point and ultimate analysis value of this substance were as follows:

Melting point: 136–137° C.
Ultimate analysis value: $C_{17}H_{12}ClF_3N_2O_2$
Theoretical values: C, 55.37; H, 3.28; N, 7.60.
Found values: C, 55.17; H, 3.39; N, 7.50.

Example 7: 1 g. of 50% sodium hydride was added to the mixture of 5.4 g. 1-(3'-trifluoromethylphenyl)-2,4-(1H,3H)-quinazolinedione and 40 cc. dried dimethylformamide, and the mixture was stirred for one hour. Then, 4.5 g. diethylaminoethylchloride were added and heated for 3 hours at 40–45° C. The solvent was then distilled under reduced pressure, the residue was added with water, and an oily substance was obtained. Said substance was extracted with ether and, after dehydration, 23% ethanol hydrochloric acid was added under cooling for acidification. Then, the solvent was distilled under reduced pressure, the residue was recrystallized from ethanol and ethyl acetate, and 6.2 g. of colorless prisms of 1-(3' - trifluoromethylphenyl)-3-(2''-diethylaminoethyl)-2,4(1H,3H) - quinazolinedione hydrochloride were obtained.

Melting point and ultimate analysis value of this substance were as follows:

Melting point: 229–230° C.
Ultimate analysis value: $C_{21}H_{23}ClF_3N_3O_2$
Theoretical values: C, 57.08; H, 5.25; N, 9.51.
Found values: C, 57.05; H, 5.47; N, 9.43.

Example 8: 2.4 g. of 50% sodium hydride were added to the mixture of 9.2 g. 1-(3'-trifluoromethylphenyl)-2,4-(1H,3H)-quinazolinedione and 80 cc. dried dimethylformamide, and the mixture was stirred for one hour. Then, ethylene bromohydrin was added and reacted for 3 hours at room temperature. The solvent was then distilled under reduced pressure, the residue was added with water, the crystals produced were filtered and dried, and, upon recrystallization from methyl alcohol, 10 g. of colorless prisms of 1 - (3' - trifluoromethylpheny) - 3 - (2''-hydroxyethyl) - 2, 4(1H, 3H) - quinazolinedione were obtained.

Melting point and ultimate analysis value of this substance were as follows:

Melting point: 138–139° C.
Ultimate analysis value: $C_{17}H_{13}F_3N_2O_3$
Theoretical values: C, 58.29; H, 3.74; N, 8.00.
Found values: C, 58.40; H, 3.71; N, 8.11.

Example 9: 1 g. of 50% sodium hydride was added to the mixture of 5.4 g. 1 - (3' - trifluoromethylphenyl) - 2,4-(1H,3H)-quinazolinedione and 40 cc. dried dimethylformamide, and the mixture was stirred for one hour. Then 3.4 g. of chloromethyl ethyl ether were added and reacted for 3 hours. The solvent was then distilled under reduced pressure, the residue was added with water, the crystals produced were filtered and dried, and, upon recrystallization from methyl alcohol, 5 g. of colorless prisms of 1-(3'-trifluoromethylphenyl) - 3 - ethoxymethyl-2,4(1H,3H)-quinazolinedione were obtained.

Melting point and ultimate analysis value of this substance were as follows:

Melting point: 157.5–159° C.
Ultimate analysis value: $C_{18}H_{15}F_3N_2O_2$
Theoretical values: C, 59.34; H, 4.15; N, 7.69.
Found values: C, 59.61; H, 4.42; N, 7.58.

Example 10: 1 g. of 50% sodium hydride was added to the mixture of 5.4 g. 1 - (3' - trifluoromethylphenyl)-2,4 (1H,3H)-quinazolinedione and 40 cc. dried dimethylformamide, and the mixture was stirred for one hour. Then, 6.7 g. of 2-bromoethyl acetate were added and reacted for 3 hours at room temperature. The solvent was then distilled under reduced pressure, the residue was added with water, the crystals produced were filtered and dried, and, upon recrystallization from methyl alcohol, 5.7 g. of colorless prisms of 1 - (3'-trifluoromethylphenyl) - 3-(2''-acetoxyethyl) - 2,4 (1H,3H) - quinazolinedione were obtained.

Melting point and ultimate analysis value of this substance were as follows:

Melting point: 111.5–112° C.
Ultimate analysis value: $C_{19}H_{15}F_3N_2O_4$
Theoretical values: C, 58.16; H, 3.85; N, 7.14.
Found values: C, 58.28; H, 3.64; N, 7.15.

Example 11: 0.5 g. of 50% sodium hydride was added to the mixture of 2.7 g. 1-(3'-trifluoromethylphenyl)-2,4-(1H,3H)-quinazolinedione and 20 cc. dried dimethylformamide, and the mixture was stirred for one hour. Then, a solution obtained by dissolving 3.4 g. 1-(3'-trifluoromethylphenyl) - 3 - monochloromethoxymethyl - 2,4(1H, 3H)-quinazolinedione in 20 cc. dried dimethylformamide was added and reacted for 4 hours at room temperature. The solvent was then distilled under reduced pressure, the residue was added with water, the crystals produced were filtered and dried, and, upon recrystallization from methyl alcohol and ethylacetate, 58 g. of colorless prisms of bis-[3-(1,3'-trifluoromethylphenyl) - 2,4 (1H, 3H) - quinazolinedione-methylether were obtained.

Melting point and ultimate analysis value of this substance were as follows:

Melting point: 114–114.5° C.
Ultimate analysis values: $C_{32}H_{20}F_6N_4O_5$
Theoretical values: C, 58.72; H, 3.08; N, 8.56.
Found values: C, 58.90; H, 2.86; N, 8.57.

Example 12: 1 g. of 50% sodium hydride was added to the mixture of 5.4 g. 1-(3'-trifluoromethylphenyl)-2,4(1H, 3H)-quinazolinedione and 40 cc. dried dimethylformamide, and the mixture was stirred for one hour. Then, 4.3 g. of 1-chloro-2-(N, N-dimethylcarbamoyloxy)-ethane were added and reacted for 4 hours at room temperature. The solvent was then distilled under reduced pressure, the residue was added with water and was held under cooling. The crystals produced were recrystallized from methyl alcohol, and 5.2 g. of colorless prisms of 1-(3'-trifluoromethylphenyl) - 3 - (2'' - N,N - dimethylcarbamoyloxyethyl) - 2,4(1H,3H) - quinazolinedione were obtained.

Melting point and ultimate analysis value of this substance were as follows:

Melting point: 157–158° C.
Ultimate analysis value: $C_{20}H_{18}F_3N_3O_4$
Theoretical values: C, 57.01; H, 4.31; N, 9.97.
Found values: C, 57.23; H, 4.20; N, 10.0.

Example 13: 1 g. of sodium hydride was added to the mixture of 5.4 g. 1 - (3' - trifluoromethylphenyl) - 2,4 (1H,3H) - quinazolinedione and 40 cc. dried dimethylformamide, and the mixture was stirred for one hour. Then, 4 g. of P-chlorobenzoylchloride were added and reacted for 3 hours at room temperature. The solvent was then distilled under reduced pressure, the residue was added with water, the crystals produced were filtered and dried, and, upon recrystallization from ethanol, 5.7 g. of colorless prisms of 1-(3'-trifluoromethlyphenyl) - 3 - (4'' - chlorobenzoyl) - 2, 4(1H,3H) - quinazolinedione were obtained.

Melting point and ultimate analysis value of this substance were as follows:

Melting point: 196–197° C.
Ultimate analysis value: $C_{22}H_{12}ClF_3N_2O_3$
Theoretical values: C, 61.33; H, 3.28; N, 6.50.
Found values: C, 61.45; H, 3.32; N, 6.33.

Example 14: 0.7 g. of sodium hydride was added to the mixture of 3.1 g. 1-(3'-trifluoromethylphenyl) - 2,4 (1H,3H) - quinazolinedione and 40 cc. dried dimethylformamide, and the mixture was stirred for one hour. Then, 2 g. of acetyl chloride were added dropwise and reacted for 3 hours at room temperature. The solvent was then distilled under reduced pressure, the residue was added with water, the crystals produced were filtered and dried, and, upon recrystallization from methyl alcohol, 2.5 g. of colorless prisms of 1-(3'-trifluoromethylphenyl) - 3 - acetyl - 2,4(1H,3H) - quinazolinedione were obtained.

Melting point and ultimate analysis value of this substance were as follows:

Melting point: 165–166° C.
Ultimate analysis value: $C_{17}H_{11}F_3N_2O_3$
Theoretical values: C, 58.62; H, 3,18; N, 8.05.
Found values: C, 58.87; H, 3.26; N, 7.91.

Example 15: The mixed solution consisting of 2 g. 1-(3' - trifluoromethylphenyl) - 2,4(1H,3H) - quinazolinedione, 30 cc. dried dimethylformamide and 1.6 g. dried pyridine was heated to 80° C. Then, 4.2 g. of benzoyl chloride were added dropwise and reacted for 3 hours at 80–90° C. It was then filtered, the filtrate was distilled under reduced pressure, the residue was added with water, the crystals produced were filtered, and, upon recrystallization from methyl alcohol, 1.8 g. of colorless prisms of 1 - (3' - trifluoromethylphenyl) - 3 - benzoyl - 2,4 (1H, 3H)-quinazolinedione were obtained.

Melting point and ultimate analysis value of this substance were as follows:

Melting point: 166–167° C.
Ultimate analysis value: $C_{22}H_{13}F_3N_2O_3$
Theoretical values: C, 64.39; H, 3.19; N, 6.83.
Found values: C, 64.24; H, 3.30; N, 6.87.

Example 16: A mixed solution consisting of 3 g. 1-(3'-trifluoromethylphenyl)-2,4 (1H,3H)-quinazolinedione, 30 cc. dimethylformamide and 4 g. triethylamine was heated to 80° C. Then, 2.8 g. of propionyl chloride were added dropwise and reacted for 3 hours at 80–90° C. It was then filtered, the filtrate was dried by evaporation under reduced pressure, the residue was added with water, the crystals produced were filtered, and, upon recrystallization from methyl alcohol, 2.8 g. of colorless needles of 1-(3'-trifluoromethylphenyl) - 3 - propionyl - 2,4(1H,3H)-quinazolinedione were obtained.

Melting point and ultimate analysis value of this substance were as follows:

melting point: 177.5–178.5° C.
ultimate analysis value: $C_{19}H_{16}F_3N_3O_4$.
theoretical values: C, 56.02; H, 3.96; N, 10.32.
found values: C, 56.21; H, 3.83; N, 10.24.

Example 17: The mixture of 5 g. 1-(3'-chlorophenyl)-2,4(1H,3H)-quinazolinedione, 1.3 g. dimethyl sulfate and 50 cc. acetone was heated for 2 hours at 50–70° C. on a water bath, then the solvent was distilled, the residue was poured into 20% sodium hydroxide solution under cooling for neutralization, the crystals produced were filtered, washed with water and dried, and, upon recrystallization from dimethylformamide, 4.2 g. of colorless prisms of 1-(3'-chlorophenyl)-3-methyl-2,4(1H,3H) - quinazolinedione were obtained.

Melting point and ultimate analysis value of this substance were as follows:

melting point: 223–226° C.
ultimate analysis value: $C_{15}H_{11}ClN_2O_2$.
theoretical values: C, 62.84; H, 3.87; N, 9.77.
found values: C, 62.75; H, 3.84; N, 9.79.

Example 18: 1 g. of 50% sodium hydride was added to the mixture of 4.1 g. 1-(3'-chlorophenyl)-2,4(1H,3H)-quinazolinedione and 40 cc. dried dimethylformamide, and the mixture was stirred for one hour. Then, 3.3 g. of glycerol-α-monochlorohydrin were added and reacted for 1.5 hours at room temperature. The solvent was distilled under reduced pressure, the residue was added with water, the crystals produced were filtered, and, upon recrystallization from methyl alcohol, 4.2 g. of colorless needles of 1-(3'-chlorophenyl) - 3-(2",3" - dihydroxypropyl) - 2,4 (1H,3H)-quinazolinedione were obtained.

Melting point and ultimate analysis value of this substance were as follows:

melting point: 163–164° C.
ultimate analysis value: $C_{17}H_{15}ClN_2O_4$.
theoretical values: C, 58.88; H, 4.36; N, 8.08.
found values: C, 59.08; H, 4.37; N, 8.07.

Example 19: 0.5 g. of 50% sodium hydride was added to the mixture of 1.5 g. 1-(2',3'-dichlorophenyl)-2,4(1H, 3H-)-quinazolinedione and 30 cc. dried dimethylformamide, and the mixture was stirred for one hour. Then, 5 g. of 2-bromoethylacetate were added and reacted for 3 hours at room temperature. The solvent was then distilled under reduced pressure, the residue was added with water, the crystals produced were then recrystallized from ethanol, and 1.7 g. of colorless needles of 1-(2',3'-dichlorophenyl)-3-(2"-acetoxyethyl) - 2,4(1H,3H) - quinazolinedione were obtained.

Melting point and ultimate analysis value of this substance were as follows:

melting point: 183.5–184.5° C.
ultimate analysis value: $C_{18}H_{14}Cl_2N_2O_4$.
theoretical values: C, 54.98; H, 3.59; N, 7.13.
found values: C, 55.00; H, 3.53; N, 7.14.

Example 20: 0.6 g. metallic sodium was added to 10 cc. ethyl alcohol, and sodium ethyl alcoholate was formed. Then, a solution obtained by dissolving 5.8 g. of 1-(2'-chlorophenyl) - 2,4(1H,3H) - quinazolinedione in 20 cc. dried dimethylformamide was added. Further, 6.6 g. of ethyliodide were added and reaction was performed for 3 hours at room temperature. Then, water was added, the crystals produced were filtered and dried, and, upon recrystallization from methyl alcohol, 5.4 g. of colorless prisms of 1-(2'-chlorophenyl)-3-ethyl-2,4(1H,3H)-quinazolinedione were obtained.

Melting point and ultimate analysis value of this substance were as follows:

melting point: 145– 146° C.
ultimate analysis value: $C_{16}H_{13}ClN_2O_2$.
theoretical values: C, 63.90; H, 4.36; N, 9.31.
found values: C, 63.96; H, 4.27; N, 9.42.

Example 21: 0.7 g. of 50% sodium hydride was added to the mixture of 2.7 g. 1-(4'-chlorophenyl)-2,4(1H,3H)-quinazolinedione and 30 cc. dried dimethylformamide, and the mixture was stirred for one hour. Then, 3.6 g. of dimethylamino-propylchloride were added and reacted for 3 hours at room temperature. The solvent was distilled under reduced pressure, the residue was added with water the crystals produced were filtered, and, upon recrystallization from methyl alcohol, 2.9 g. of colorless needles of 1-(4'-chlorophenyl)-3-(3" - dimethylaminopropyl)-2,4 (1H,3H)-quinazolinedione were obtained.

Melting point and ultimate analysis value of this substance were as follows:

melting point: 164.5–165.5° C.
ultimate analysis values: $C_{19}H_{20}ClN_3O_2$.
theoretical values: C, 63.77; H, 5.63; N, 11.74.
found values: C, 63.62; H, 5.65; N, 11.50.

Example 22: 1.1 g. of sodium amide were added to the mixture of 4.5 g. 1-(3',4'-dichlorophenyl) - 2,4(1H,3H)-quinazolinedione and 40 cc. dimethylformamide, and the mixture was stirred for one hour. Then, 7.3 g. of ethylbromoacetate were added and reacted for one hour. The solvent was then distilled under reduced pressure, the residue was added with water, the crystals produced were filtered, and, upon recrystallization from the mixed solvent consisting of dimethylformamide and ethanol, 4.6 g. of colorless prisms of 1-(3',4'-dichlorophenyl)-2,4(1H,3H)-quinazolinedione-3-acetic acid ethyl ester were obtained.

Melting point and ultimate analysis value of this substance were as follows:

melting point: 157.5–158.5° C.
ultimate analysis value: $C_{18}H_{14}Cl_2N_2O_4$.
theoretical values: C, 54.98; H, 3.59; N, 7.12.
found values: C, 54.93; H, 3.53; N, 7.06.

Example 23: 0.6 g. of 50% sodium hydrate was added to the mixture of 1.7 g. 1-(2',6'-dichlorophenyl)-2,4(1H, 3H)-quinazolinedione and 30 cc. dried dimethylformamide, and the mixture was reacted for one hour at room temperature. Then, 5 g. of ethyliodide were added, and the mixture was further reacted for two hours at room temperature. Then, the solvent was distilled under reduced pressure, the residue was added with water, the crystals produced were filtered, and, upon recrystallization from methyl alcohol, 1.5 g. of colorless prisms of 1-(2',6'-dichlorophenyl)-3-ethyl-2,4(1H,3H)-quinazolinedione were obtained.

Melting point and ultimate analysis value of this substance were as follows:

melting point: 174.5–175.5° C.
ultimate analysis value: $C_{16}H_{12}Cl_2N_2O_2$.
theoretical values: C, 57.33; H, 3.61; N, 8.36.
found values: C, 57.43; H, 3.49; N, 8.34.

Example 24: 0.8 g. of 50% sodium hydride was added to the mixture of 3 g. 1-(3'-fluorophenyl)-2,4(1H,3H)-quinazolinedione and 30 cc. dried dimethyl formamide, and the mixture was stirred for one hour. Then, 3.7 g. of ethylene-bromohydrin were added and reacted for 3 hours at room temperature. The solvent was then distilled under reduced pressure, the residue was added with water, the crystals produced were then recrystallized from the mixed solvent consisting of methyl alcohol and water, and 2.9 g. of colorless prisms of 1-(3'-fluorophenyl)-3-(2" - hydroxyethyl) - 2,4(1H,3H) - quinazolinedione were obtained.

Melting point and ultimate analysis value of this substance were as follows:

Melting point: 136.5–137.5° C.
Ultimate analysis value: $C_{16}H_{13}FN_2O_3$
Theoretical values: C, 63.99; H, 4.36; N, 9.33.
Found values: C, 64.15; H, 4.07; N, 9.37.

Example 25: The mixture of 1.8 g. 1-(4'-fluorophenyl)-2,4(1H,3H)-quinazolinedione, 3 g. diethyl sulfate and 50 cc. acetone was heated for 2 hours at 50–70° C. on a water bath. The solvent was then distilled, the residue was poured into 20% sodium hydroxide solution under cooling for neutralization, the crystals produced were filtered and washed with water, and, upon recrystallization from the mixed solvent consisting of methyl alcohol and dimethylformamide, 1.6 g. of colorless prisms of 1 - (4' - fluorophenyl) - 3 - ethyl - 2,4(1H,3H)-quinazolinedione were obtained.

Melting point and ultimate analysis value of this substance were as follows:

Melting point: 213–215° C.
Ultimate analysis value: $C_{16}H_{13}FN_2O_2$
Theoretical values: C, 67.60; H, 4.61; N, 9.85.
Found values: C, 67.51; H, 4.38; N, 9.91.

Example 26: 0.7 g. of 50% sodium hydride was added to the mixture of 1.8 g. 1 - (4'-fluorophenyl)-2,4(1H,3H)-quinazolinedione and 30 cc. dried dimethylformamide, and the mixture was stirred for one hour. Then, 3.2 g. of 2-bromoethylethyl ether were added and reacted for 3 hours at room temperature. The solvent was then distilled under reduced pressure, the residue was added with water, the crystals produced were filtered, and, upon recrystallization from the mixed solvent consisting of methyl alcohol and water, 1.8 g. of colorless needles of 1 - (4' - fluorophenyl) - 3 - (2" - ethoxyethyl)-2,4(1H,3H)-quinazolinedione were obtained.

Melting point and ultimate analysis value of this substance were as follows:

Melting point: 112–113° C.
Ultimate analysis value: $C_{18}H_{17}FN_2O_3$
Theoretical values: C, 65.85; H, 5.22; N, 8.53.
Found values: C, 65.79; H, 5.34; N, 8.64.

Example 27: 0.4 g. of 50% sodium hydride was added to the mixture of 2 g. 1 - (3' - bromophenyl)-2,4(1H,3H)-quinazolinedione and 30 cc. dried dimethylformamide, and the mixture was stirred for one hour. Then, 5 g. of 2-bromoethylacetate were added and reacted for 3 hours at room temperature. The solvent was then distilled under reduced pressure, the residue was added with water, the crystals produced were filtered, and, upon recrystallization from methyl alcohol, 1.8 g. of colorless prisms of 1-(3' - bromophenyl) - 3-(2"-acetoxyethyl)-2,4(1H,3H)-quinazolinedione were obtained.

Melting point and ultimate analysis value of this substance were as follows:

Melting point: 145–146° C.
Ultimate analysis value: $C_{18}H_{15}BrN_2O_4$
Theoretical values: C, 53.61; H, 3.75; N, 6.95.
Found values: C, 53.46; H, 3.71; N, 6.80.

Example 28: 0.6 g. metallic sodium was added to 10 cc. ethyl alcohol and sodium ethylate was formed. Then, a solution obtained by dissolving 5.3 g. 1 - (2',3' - dimethylphenyl)-2,4(1H,3H)-quinazolinedione in 20 cc. dried dimethylformamide was added. Further, 4.6 g. of ethyliodide were added, and the mixture was reacted for 3 hours at room temperature. Then, water was added, the crystals produced were filtered, and, upon recrystallization from methyl alcohol, 4.7 g. of colorless needles of 1-(2',3'-dimethylphenyl) - 3 - ethyl-2,4(1H,3H)-quinazolinedione were obtained.

Melting point and ultimate analysis value of this substance were as follows:

Melting point: 202–205° C.
Ultimate analysis value: $C_{18}H_{18}N_2O_2$
Theoretical values: C, 73.45; H, 6.16; N, 9.52.
Found values: C, 72.80; H, 5.93; N, 9.64.

Example 29: 0.5 g. of 50% sodium hydride was added to the mixture of 1.5 g. 1 - (3' - methoxyphenyl) - 2,4-(1H,3H)-quinazolinedione and 30 cc. dried dimethylformamide, and the mixture was stirred for one hour. Then, 5 g. of 2-bromoethylacetate were added and reacted for 3 hours at room temperature. The solvent was distilled under reduced pressure, the residue was added with water, the crystals produced were filtered, and, upon recrystallization from methyl alcohol, 1.8 g. of colorless prisms of 1 - (3' - methoxyphenyl) - 3 - (2" - acetoxyethyl)-2,4-(1H,3H)-quinazolinedione were obtained.

Melting point and ultimate analysis value of this substance were as follows:

Melting point: 130–131° C.
Ultimate analysis value: $C_{19}H_{18}N_2O_5$
Theoretical values: C, 64.40; H, 5.12; N, 7.91.
Found values: C, 64.52; H, 4.96; N, 7.85.

Example 30: 0.2 g. of sodium amide was added to the mixture of 1 g. 1 - (4' - ethoxyphenyl)-2,4(1H,3H)-quinazolinedione and 20 cc. dried dimethylformamide, and the mixture was stirred for one hour. Then, 1.9 g. of bromochloroethane were added and the mixture was reacted for 3 hours at room temperature. The solvent was then distilled under reduced pressure, the residue was added with water, the crystals produced were filtered, and, upon recrystallization from methyl alcohol, 1.0 g. of colorless needles of 1 - (4' - ethoxyphenyl) - 3 - (2"-chloroethyl)-2,4(1H,3H)-quinazolinedione was obtained.

Melting point and ultimate analysis value of this substance were as follows:

Melting point: 144–146° C.
Ultimate analysis value: $C_{18}H_{17}ClN_2O_3$
Theoretical values: C, 62.70; H, 4.97; N, 8.12.
Found values: C, 62.66; H, 4.96; N, 8.25.

Example 31: 0.6 g. of 50% sodium hydride was added to the mixture of 2.4 g. 1-phenyl-2,4(1H,3H)-quinazolinedione and 30 cc. dried dimethylformamide, and the mixture was stirred for one hour. Then, 6.8 g. of 2-bromoethylbenzoate were added and reacted for 3 hours at room temperature. The solvent was then distilled under reduced pressure, the residue was added with water, the crystals produced were then recrystallized from the mixed solvent consisting of dimethylformamide and methyl alcohol, and 3.9 g. of 1 - phenyl - 3 - benzoyloxyethyl)-2,4(1H,3H)-quinazolinedione were obtained.

Melting point and ultimate analysis value of this substance were as follows:

Melting point: 150.5–151° C.
Ultimate analysis values:
Theoretical values: C, 71.49; H, 4.70; N, 7.25.
Found values: C, 71.41; H, 4.79; N, 7.35.

Example 32: 2.8 g. of propionyl chloride were added dropwise to the mixed solution consisting of 5.6 g. 1-phenyl-2,4(1H,3H)-quinazolinedione, 30 cc. dried dimethylformamide and 4 g. triethylamine, and the mixture was reacted for 3 hours at 80–90° C. The solvent was then distilled under reduced pressure, the residue was added with water, the crystals produced were filtered, and, upon recrystallization from methyl alcohol, 2.3 g. of colorless needles of 1-phenyl-3-propionyl-2,4(1H,3H)-quinazolinedione were obtained.

Melting point and ultimate analysis value of this substance were as follows:

melting point: 154–155° C.
ultimate analysis value: $C_{17}H_{14}N_2O_3$
theoretical values: C,69.37; H,4.79; N,9.52.
found values: C,69.21; H,4.87; N,9.31.

Example 33: 0.7 g. of 50% sodium hydride was added to the mixture of 1.9 g. 1-(3'methylphenyl)-2,4(1H,3H)-quinazolinedione and 30 cc. dried dimethylformamide, and the mixture was stirred for one hour. Then, 3 g. of ethylenebromohydrin were added and reacted for 3 hours at room temperature. The solvent was then distilled under reduced pressure, the residue was added with water, the crystals produced were filtered, and, upon recrystallization from the mixed solvent consisting of methyl alcohol and water, 1.9 g. of colorless prisms of 1-(3'methylphenyl)-3-(2''-hydroxyethyl) - 2,4(1H,3H) - quinazolinedione were obtained.

Melting point and ultimate analysis value of this substance were as follows:

melting point: 152–154° C.
ultimate analysis value: $C_{17}H_{16}N_2O_3$
theoretical values: C,68.91; H,5.44; N,9.45.
found values: C,68.74; H,5.24; N,9.45.

What we claim is:
1. Quinazolinedione derivative of the formula:

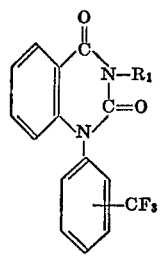

wherein $R_1$ represents methyl, ethyl, chloroethyl, diethylaminoethyl, hydroxyethyl, ethoxyethyl or acetoxyethyl.

2. The compound of claim 1 wherein $R_1$ is methyl.
3. The compound of claim 1 wherein $R_1$ is ethyl.
4. The compound of claim 1 wherein $R_1$ is chloroethyl.
5. The compound of claim 1 wherein $R_1$ is diethylaminoethyl.
6. The compound of claim 1 wherein $R_1$ is hydroxyethyl.
7. The compound of claim 1 wherein $R_1$ is ethoxyethyl.
8. The compound of claim 1 wherein $R_1$ is acetoxyethyl.

References Cited
UNITED STATES PATENTS

| | | | |
|---|---|---|---|
| 3,235,363 | 2/66 | Luckenbough | 260—260 |
| 3,503,978 | 3/70 | Zeidler | 260—260 |
| 3,544,575 | 12/70 | Scheuerer | 260—260 |
| 3,551,429 | 12/70 | Zeidler | 260—260 |

DONALD G. DAUS, Primary Examiner

A. M. T. TIGHE, Assistant Examiner

U.S. Cl. X.R.
424—251